Dec. 31, 1935.  C. E. HATHORN  2,025,744
METHOD OF AND APPARATUS FOR ELECTRIC SPOT WELDING
Filed March 17, 1934
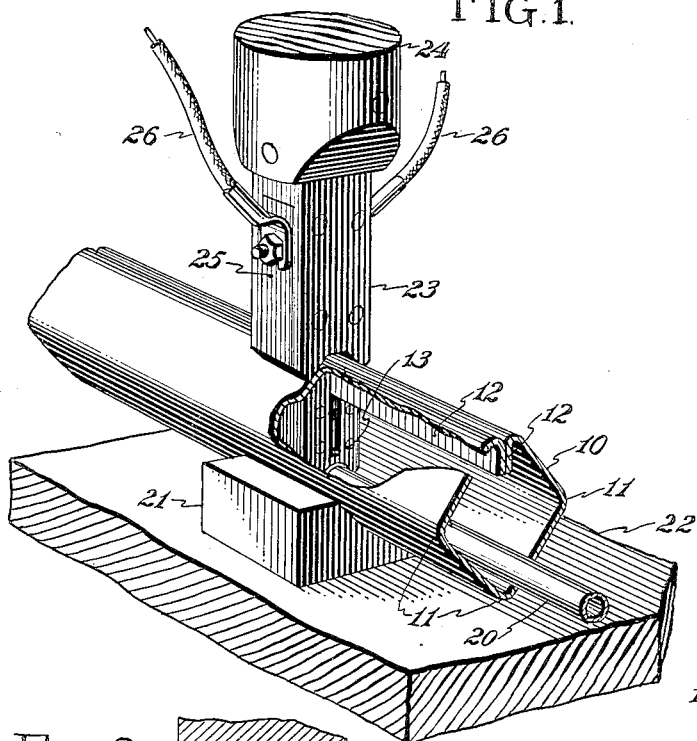
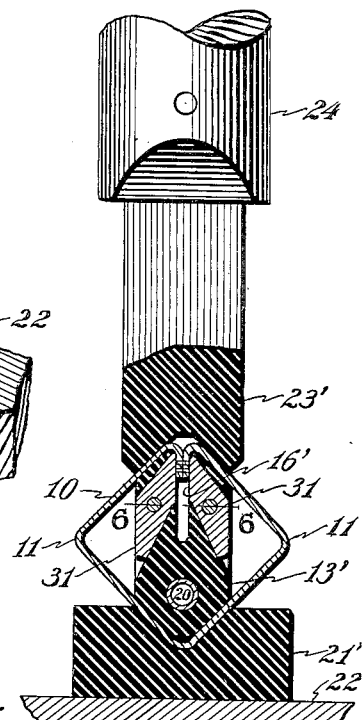
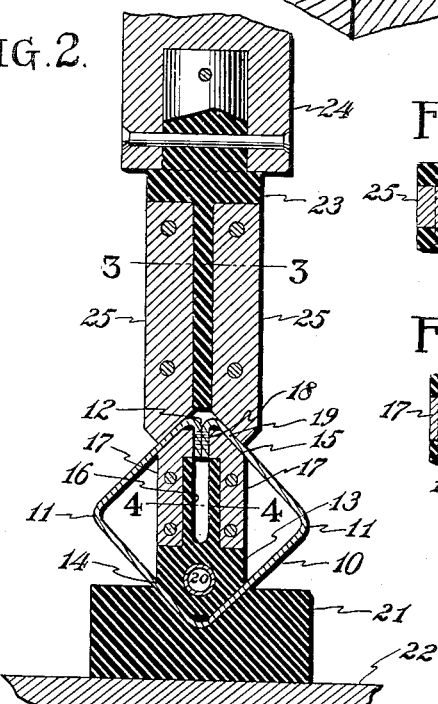
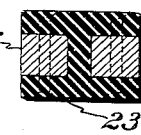
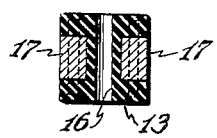
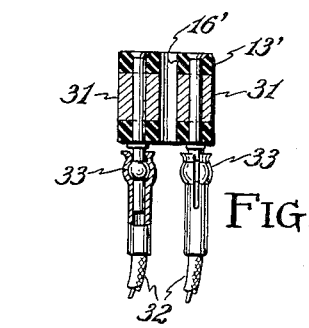
INVENTOR.
CHARLES E. HATHORN.
BY
ATTORNEYS.

Patented Dec. 31, 1935

2,025,744

UNITED STATES PATENT OFFICE 2,025,744

METHOD OF AND APPARATUS FOR ELECTRIC SPOT WELDING

Charles E. Hathorn, Kenmore, N. Y., assignor to Curtiss Aeroplane & Motor Company, Inc., a corporation of New York Application March 17, 1934, Serial No. 716,016

16 Claims. (Cl. 219—6)

This invention relates to a method of and apparatus for electric spot welding of metal tubes.

The type of tube structure with which the invention is concerned comprises tubular members formed from flat sheet metal, the metal strip having flanged edges and the strip being bent into the form of a tube so that the flanges abut each other and extend inwardly from the tube surface. This arrangement permits of a smooth exterior tube surface, without projections. Such a tube is particularly useful when made from stainless steel, and when the tube is designed for use as a structural part of aircraft. To weld the flanges of such a tube requires special apparatus, and it is with this apparatus that the invention is particularly concerned.

I provide an insulating block having a slot therein for fitting engagement with the inwardly turned tube flanges, the block having electrodes mounted in the slot for contact with said flanges. Conductors are led from these electrodes through the tube, or alternately, the electrodes may contact other portions of the inner tube surface. Externally of the tube, members are pressed thereagainst to slightly deform the tube wall and to cause intimate contact between the tube and block. The block is resilient, so that deformation of the tube causes deformation of the block, thus causing the electrodes to intimately contact the inturned tube flanges. Thereupon, a welding current may be passed to the electrodes to spot weld the flanges to each other.

In practice, each weld may be quickly made, after which the tube is moved with respect to the block and pressure member in readiness for another weld.

Objects of the invention are to provide a method of electrically spot welding tubes and other closed members; to provide apparatus for electrically spot welding elements in the interior of tubes or other closed members; to provide a method and apparatus for completing the formation of tubes from strip sheet metal, wherein the outer surface of the resulting tube is free from projecting flanges; and to provide a method and apparatus for spot welding interior flanges on tubes or closed members having a limited amount of space therewithin. Another object of the invention is to provide alternative forms of apparatus for accomplishing the above objectives, one embodiment including direct electrical connections to the welding electrodes, and the other including indirect connections to the electrodes.

A more complete understanding of the invention, as well as further objects thereof, may be obtained by referring to the annexed detail description in conjunction with the drawing, in which similar numbers indicate similar parts, and in which:

Fig. 1 is a perspective view, partly broken away, of a tube being welded according to the method of the invention;

Fig. 2 is a sectional elevation of the tube and apparatus of Fig. 1;

Fig. 3 is a section on the line 3—3 of Fig. 2;

Fig. 4 is a section on the line 4—4 of Fig. 2;

Fig. 5 is a side elevation, partly in section, of an alternative apparatus to accomplish the desired welding method; and Fig. 6 is a section on the line 6—6 of Fig. 5.

The form of member to be welded is shown as a substantially square tube 10, formed by bending a strip of metal into the square form with adequate fillets 11 at the corners thereof. The edges of the strip are bent inwardly to form flanges 12 at one corner of the tube, these flanges abutting each other. Upon spot welding of the flanges to each other, the tube is complete and presents a relatively smooth outer surface, free from protrusions. Such a tube may be fabricated from stainless or alloy steels which usually are supplied as flat sheet, and which are difficult to procure as drawn or extruded tubing. Likewise, such a tube may be made of very thin gauge material, whereby great strength with extreme lightness accrue.

To effect welding of the flanges 12, a block 13 of insulating material is shaped to slide loosely within the tube 10, said block having lower surfaces 14 contacting the lower inner surfaces of the tube, and having upper surfaces 15 loosely contacting the upper inner surfaces of the tube on each side of the flanges 12. The block 13 is slotted at 16, the flanges 12 fitting within the slot. A pair of electrodes 17 is fitted into a suitable recess in the block 13, one of the pair on each side of the slot 16, and these are arranged to establish a restricted welding contact with the flanges 12, at 18. Each electrode is also organized to contact the inner tube wall at 19, adjacent the flanges 12, for the supply of welding current to the point of welding, as will be more fully pointed out hereinafter. A rod 20 is fixed to the block 13 and extends parallel to the tube 10, the rod serving as a handle for moving the block 13 along the tube as successive welds are made.

A lower grooved block 21 is mounted on a base 22, the groove being arranged to receive the lower corner of the tube 10. An upper grooved block 23 is fixed to a reciprocating press plunger 24, the press being of any convenient form. The groove of the block 23 engages the tube 10 at its upper corner, the side faces of the groove contacting the side faces of the tube adjacent the flanges 12. It will be seen, then, that by pressing the plunger down, the block 23 will tend to pinch the upper tube faces together, and to press the flanges 12 toward each other. Also, by such pressure, the upper portions of the block 13, by virtue of the slot 16 and the resiliency of the block material, are pressed into firm contact with the flanges 12, the electrodes 17 having good contact with the flanges and with inner surfaces of the tube wall.

The block 23 is provided with a pair of contact elements 25 which, when the plunger is pressed down, contact the outer tube surfaces at points opposite to the points of contact of the electrodes 17 therewith. A pair of cables 26 are attached to the contact pieces 25, and lead to the conventional welding transformer.

In operation, assuming copper contact pieces and electrodes, and stainless steel alloy for the tube 10, and the broad welding method wherein high amperage welding current effects the weld in a timed interval of a small fraction of a second, the welding current passes from the contact pieces 25 through the tube wall to the electrodes, the passage of current at this stage offering little heating effect to the tube sheet due to the relatively large area of contact. The welding current passing between the electrodes 17 must pass through the restricted portion 18 at the flanges, whereby the flange weld is effected. As the specific resistance of the stainless steel is quite high, but little of the welding current is by-passed around the portion to be welded through the tube proper.

Figs. 5 and 6 show an alternative arrangement of the welding blocks applied to the same form of tube 10. Here, electrodes 31 carried by the block 13', and spaced by the slot 16', are connected directly to the welding transformer by flexible cables 32, snap connectors 33 effecting the cable-electrode connection. The electrodes are insulated by the insulating material of the block 13', from contact with any portion of the tube 10 except at the flanges 12 where the weld is to be made. The upper and lower pressure blocks 21' and 23', and their function in the welding process, are the same as described in connection with the first embodiment. In this case, however, the block 23' is homogeneous and requires no contact pieces.

In using the apparatus, the blocks 13, 21 and 23 may be mounted in vertical alignment, the rod 20 holding the block 13. The tube 10 may be moved along the blocks and a series of closely spaced welds may be made with a minimum of trouble.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. Apparatus for spot welding inwardly bent flanges of a formed tube comprising a bifurcated member insertable within the tube and having its bifurcations straddling adjacent flanges, contact pieces carried by said member for contact with said flanges, and means for causing said contact pieces to bear under pressure on said flanges comprising an externally applied member having elements engageable with portions of said tube on the inner surface of which said bifurcations are in contact.

2. In apparatus for welding inturned flanges of a tube, a member adapted to be inserted within said tube, said member having portions bearing on the inner tube walls and having contact pieces bearing on opposite faces of the flanges to be welded, means externally of said tube for pressing on the outer faces of said tube opposite the bearing points of said member on the inner face of said tube, and electrical connections to each of said contact pieces.

3. The method of welding together inturned flanges of a tube formed from sheet metal which comprises inserting a pair of electrodes within the tube so that one electrode is in electrical contact with each of the pair of flanges, each said electrode having contact with the inner surfaces of said tube, then applying pressure externally of said tube at points opposite to the point of contact of said electrodes with the inner surface of said tube, whereby said electrodes are pressed against said flanges, and then applying a welding current through said electrodes.

4. Apparatus for welding the inturned flanges of a strip of metal formed as a tube, said tube being of substantially rectangular conformation and having said flanges at a corner thereof, comprising a block insertable within said tube and having faces engaging the inner surface of the several side faces thereof, electrodes carried by said block for contact with an opposed face of each said flange, means for making an electric welding circuit through said electrodes and flanges, and means bearing on the outer surface of said tube at points opposite to those points at which said block engages the inner surfaces of said tube, for pressing against said block to effect pressure of said electrodes on said flanges.

5. Means for electrically welding elements within a relatively closed flexible member comprising a block insertable within said member, an electrode carried by said block, an electrical connection from said electrode to a source of welding current, said block loosely engaging certain of the inner surfaces of said member and said electrode loosely engaging the element to be welded, and means bearing on the outer surface of said flexible member at points opposite the bearing points of said block on the inner surface thereof; said bearing means being arranged to press on said member to thus cause, by deformation of said flexible member, intimate engagement of said block with the inner surface of said member and of said electrode with the element to be welded.

6. Means for electrically welding elements within and forming part of a hollow member comprising a block within said member, means for pressing said member with its elements against said block, and means for passing a welding current through said hollow member and elements.

7. Means for electrically welding edges of a hollow member formed from sheet material, comprising a block insertable within said member, an electrode carried by said block and contacting an inner surface of said hollow member, and a second electrode organized to be pressed against said hollow member opposite to the point of contact of said first electrode therewith.

8. Means for electrically welding edges of a hollow member formed from sheet material, comprising a block insertable within said member and bearing on a portion of the inner surface thereof, an electrode carried by said block and adapted to engage a portion of the inner surface of said member opposite to that portion engaged by said block, and means for pressing externally on said member to effect intimate contact between said electrode and said member.

9. Means for electrically welding inturned edge flanges of a sheet metal strip formed as a tube, said flanges, when welded, serving to complete the closure of said tube, comprising a slotted block insertable within said tube, said flanges engaging within said slot, electrodes carried by said block and forming the bounding surfaces of said slot whereby said electrodes contact said flanges, means for establishing electrical connections with said electrodes, and means acting externally upon said tube for deforming same to bear on said block and to establish intimate contact between said tube and said block.

10. Means for electrically welding inturned edge flanges of a sheet metal strip formed as a tube, said flanges when welded serving to complete the closure of said tube, comprising a slotted block insertable within said tube and loosely contacting opposed faces of said tube, electrodes forming the inner surfaces of said slot for contacting said edge flanges, said electrodes extending to an outer surface of said block to contact an inner surface of said tube, and a grooved member engageable under pressure with the outer surface of said tube, said member having contact pieces contacting said tube at points opposite the points of contact of said electrodes with the inner surfaces of said tube whereby welding current for welding said flanges passes through said contact pieces, said tube and said electrodes.

11. Means for electrically welding a pair of elements to each other comprising an electrode adapted to press against each said element opposite the point at which the weld is to be effected, and to bear at another point on each said element, and means organized to bear upon each said element opposite said other point at which each said electrode bears on each said element, by which pressure imposed on said means is passed through said element, and to said electrode, to hold said electrode in intimate pressure contact with said element.

12. In means for welding a pair of elements to each other, an electrode on one side of said element, bearing thereon at a point adjacent the weld point and at another point relatively remote from said weld point, and means pressing on the opposite side of said element adjacent said other point for effecting intimate contact of said electrode with said element at both said points.

13. Means for resistance welding a metal element having an acute bend therein, the weld point being spaced from the apex of said bend, comprising an electrode embraced by said bent element and bearing on the metal faces adjacent the bent apex, said electrode having a portion contacting the metal element adjacent the weld point, and means acting on an outer surface of said element on the side of the bend opposite the weld point for pressing said element upon said electrode to provide intimate contact thereof with said element at both sides of said bend.

14. In means for resistance welding wherein a piece to be welded is closely spaced to a second piece, and wherein said pieces are relatively movable in slight degree, an electrode inserted between said pieces and bearing upon both, said electrode contacting said first named piece at the point to be welded, and means bearing upon said second piece on the side thereof opposite to that side with which said electrode engages, said means being pressable upon said second piece to move it, and to thus move the electrode into intimate contact with said first piece.

15. In means for resistance welding wherein a piece to be welded is closely spaced to a second piece, and wherein said pieces are relatively movable in slight degree, an electrode inserted between said pieces and bearing upon both, said electrode contacting said first named piece at the point to be welded, means bearing upon said second piece on the side thereof opposite to that side with which said electrode engages, said means being pressable upon said second piece to move it, and to thus move the electrode into intimate contact with said first piece, and an electric welding connection to said pressable means by which current flows therefrom through said second piece, and through said electrode by virtue of its intimate contact therewith, to said welding point.

16. In means for welding one element to a second element, said second element comprising spaced apart pieces, one of which is to be welded to said first element, and the normal space between said pieces being reducible by deflection of said pieces, a filler block carrying an electrode insertable within said space and having clearance from said pieces, and means for causing intimate contact of said electrode with the piece to be welded comprising a member bearing on the outside of the other said piece and adapted to cause intimate contact of both said pieces with said filler block by deflection of said pieces.

CHARLES E. HATHORN.